(12) United States Patent
Coppolani et al.

(10) Patent No.: US 8,751,299 B2
(45) Date of Patent: Jun. 10, 2014

(54) METHODS AND SYSTEMS FOR MANAGING COUPONS

(75) Inventors: Philippe Coppolani, Elancourt (FR); Charles Devaux, Puteaux (FR)

(73) Assignee: Bouygues Telecom (FR)

( * ) Notice: Subject to any disclaimer, the term of this patent is extended or adjusted under 35 U.S.C. 154(b) by 1673 days.

(21) Appl. No.: 12/012,080

(22) Filed: Jan. 31, 2008

(65) Prior Publication Data

US 2008/0183581 A1 Jul. 31, 2008

(30) Foreign Application Priority Data

Jan. 31, 2007 (FR) ...................................... 07 00691

(51) Int. Cl.
  *G06Q 30/00* (2012.01)
  *G06F 15/16* (2006.01)
  *G06Q 20/38* (2012.01)
  *G06Q 30/02* (2012.01)

(52) U.S. Cl.
  CPC .......... *G06Q 20/387* (2013.01); *G06Q 30/0239* (2013.01); *G06Q 30/02* (2013.01)
  USPC ....................... 705/14.39; 709/201

(58) Field of Classification Search
  CPC .. G06Q 20/387; G06Q 30/0239; G06Q 30/02
  USPC ............... 705/14, 14.1, 14.22, 14.37, 14.38, 705/14.64, 14.65; 709/201
  See application file for complete search history.

(56) References Cited

U.S. PATENT DOCUMENTS

| | | | | |
|---|---|---|---|---|
| 6,385,591 B1 * | 5/2002 | Mankoff | ..................... | 705/14.26 |
| 6,763,336 B1 * | 7/2004 | Kolls | ............... | 705/44 |
| 7,240,023 B1 * | 7/2007 | Powell | ........................ | 705/14.39 |
| RE40,186 E * | 3/2008 | Walker et al. | .............. | 705/14.25 |
| 7,367,500 B2 * | 5/2008 | Fajkowski | ...................... | 235/383 |
| 2002/0029169 A1 * | 3/2002 | Oki et al. | ........................ | 705/26 |
| 2002/0077907 A1 * | 6/2002 | Ukai et al. | ...................... | 705/14 |
| 2002/0091569 A1 * | 7/2002 | Kitaura et al. | .................. | 705/14 |
| 2002/0091571 A1 * | 7/2002 | Thomas et al. | ................. | 705/14 |
| 2002/0095333 A1 * | 7/2002 | Jokinen et al. | .................. | 705/14 |
| 2003/0004808 A1 * | 1/2003 | Elhaoussine et al. | ........... | 705/14 |
| 2004/0140361 A1 * | 7/2004 | Paul et al. | ................ | 235/462.45 |
| 2004/0243519 A1 * | 12/2004 | Perttila et al. | ................... | 705/75 |
| 2004/0260608 A1 * | 12/2004 | Lewis et al. | ..................... | 705/14 |
| 2004/0267546 A1 * | 12/2004 | Yamada | ............................ | 705/1 |
| 2005/0131761 A1 * | 6/2005 | Trika et al. | ...................... | 705/14 |
| 2005/0149400 A1 | 7/2005 | Watkins | | |
| 2006/0265281 A1 * | 11/2006 | Sprovieri et al. | .............. | 705/14 |

FOREIGN PATENT DOCUMENTS

| | | | | | |
|---|---|---|---|---|---|
| EP | 1953695 | * | 6/2008 | ............ | G06Q 30/00 |
| JP | 2005-157787 A2 | | 6/2005 | | |
| WO | WO 98/19229 A1 | | 5/1998 | | |

* cited by examiner

*Primary Examiner* — Ella Colbert

(74) *Attorney, Agent, or Firm* — DLA Piper LLP (US)

(57) ABSTRACT

A method for managing at least one coupon for a user equipped with a mobile terminal including a collector, a communicator, and a memory which store a set of data relating to the coupon, including collecting by the collection means of the mobile terminal, data contained in a terminal and/or a station and/or a tag; transmitting the data by the mobile terminal to an interactive station; sending an enquiry based on the data by the interactive station to a local server associated with a database; and publishing, by the interactive station, information items corresponding to processing of a received response to the enquiry transmitted by the local server.

16 Claims, 4 Drawing Sheets

METHODS AND SYSTEMS FOR MANAGING COUPONS

RELATED APPLICATION

This application claims priority of French patent application Ser. No. 07/00691, filed Jan. 31, 2007, herein incorporated by reference.

TECHNICAL FIELD

This disclosure relates to the field of managing coupons, more particularly to systems and methods for managing at least one coupon in paper form or in electronic form via a mobile terminal.

BACKGROUND

As part of a marketing plan, some companies have set up coupon systems with the aim of attracting new customers or gaining the loyalty of old customers. Mechanisms have, therefore, been put in place by these companies, but they do not give their customers the opportunity to gain the optimum benefit from the various discount offers.

In the prior art, systems are known that disclose coupons in paper form which allow the customer to benefit from discounts on products. These coupons are cut from newspapers, magazines, or may be printed from interactive stations located in points of sale belonging to these companies.

The drawback of such systems is that of having customers who collect the various discount coupons, but cannot benefit from the various discount offers proposed to them since these coupons can be lost or damaged or may pass their expiration date.

Other systems are also known that provide coupons in digital form which are stored in a memory of a chip card. A customer who owns this chip card acquires these coupons from interactive stations located in the various points of sale of these companies.

These systems have the drawback that they require the customer to visit a point of sale to be able to collect these various coupons. Furthermore, the customer has to search on the interactive station to select the coupons of interest among the discount offers.

JP 2005-157787 A2 discloses a system which makes it possible to collect data, relating to ranges of products, contained in RFID/NFC (Radio Frequency Identification/Near Field Communication) tags and a mobile telephone belonging to the customer and comprising an RFID/NFC tag reader. These tags are available, for example, in newspapers or on advertising posters. That mobile telephone has a memory unit which allows it to store these data. The mobile telephone warns the customer via its RFID/NFC tag reader with an audio or vibrating signal, as the user passes a point of sale, of the presence of a product referenced in its memory within its range.

Such a system does not make it possible to determine the location of a product in a point of sale which is not located within the range of the RFID/NFC tag reader of the mobile telephone. Furthermore, it does not comprise means which allow the customer to have information items relating to the coupon, such as the availability of the associated product at the point of sale or the date of expiration of the coupon.

It could, therefore, be advantageous to provide systems and methods which allow the customer to gain optimum benefit from the various discount offers by means of the information items made available via a mobile terminal and an interactive station.

It could also be advantageous to provide systems having the advantage of being able to be adapted to existing hardware infrastructures.

SUMMARY

We provide a method for managing at least one coupon for a user equipped with a mobile terminal including a collector, a communicator, and a memory which store a set of data relating to the coupon.

We also provide a system that manages at least one coupon including a mobile terminal including a memory that stores data relating to the coupon; an interactive station including a connection that transmits enquiries to a local server, publishing means that transmits to the user information items corresponding to processing a received response to an enquiry transmitted by the local server, and a first communication means; and a second communication means that exchanges data with the first communication means of an interactive station.

BRIEF DESCRIPTION OF THE DRAWINGS

The disclosure will be better understood with the aid of the description, given below purely by way of example, of a selected representative example, with reference to the appended drawings, in which.

DETAILED DESCRIPTION

Figure 1:
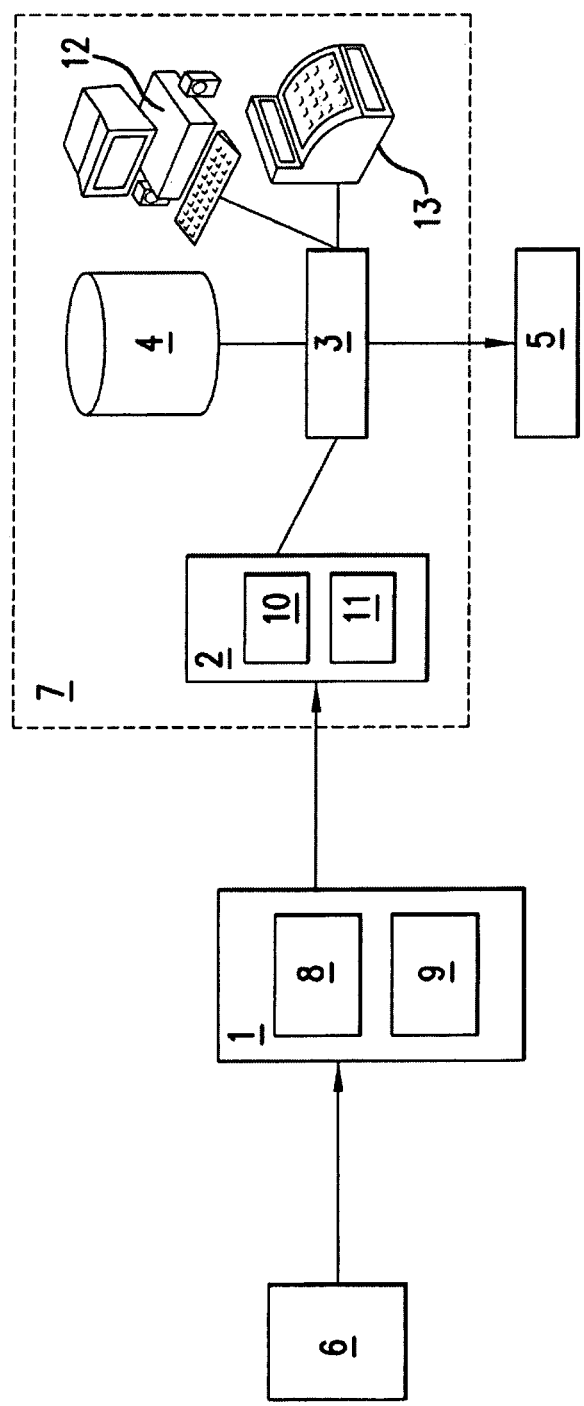
FIG. 1 schematically shows a mode of operation of the system.

We provide methods for managing at least one coupon for a user equipped with a mobile terminal, the mobile terminal comprising collection means, communication means, and memory means which store a set of data relating to the coupon, wherein the method comprises:

transmitting the data by the mobile terminal to an interactive station;

sending an enquiry based on the data by the interactive station to a local server associated with a database; and publishing, by the interactive station, information items corresponding to the processing of a received response to the enquiry transmitted by the local server.

This method allows the user to always have the user's discount coupons on a mobile terminal, to be able to consult the coupons and to be able to update the information items relating to these coupons, the information items relating to the availability of the product associated with the discount offer, to the points of sale where it is available or to the date of expiration of the offer. In this way, management of the discount coupons is simplified and, thus, allows the user to benefit in an optimal manner from all the commercial offers of interest.

Advantageously, the method comprises a preliminary step of interrogating a central server by the local server based on the data contained in the enquiry to update the information items contained in the response given by the local server.

Advantageously, the transmission step comprises a substep of selection of one of the information items via the display and input means of the mobile terminal.

In one aspect, it comprises a preliminary step of interrogating a central server by the local server based on the data contained in the enquiry to update the information items contained in the database.

In another aspect, it comprises a step of updating of the data contained in the memory means of the mobile terminal by the interactive station.

Advantageously, the data publishing step comprises a substep of generation of at least one discount coupon in paper format by printing means. In one aspect, it comprises a step of interrogation, via input and display means, of the interactive station to obtain information items relating to the coupon. Advantageously, the information items relate to the availability of the product associated with the discount coupon. The information items may relate to a physical location of the product and the collection step may correspond to an exchange of data between mobile terminals, the exchanged data corresponding to at least one coupon.

We also provide systems for managing at least one coupon comprising a mobile terminal comprising memory means for storing data relating to the coupon, wherein the mobile terminal comprises communication means for exchanging data with communication means of an interactive station, the interactive station comprising:

connection means for transmitting enquiries to a local server; and publishing means for transmitting, to the user, information items corresponding to the processing of a received response to the enquiry transmitted by the local server.

The mobile terminal may comprise display and input means to allow the user to select an information item relating to the coupon. The communication means may be of the wireless or infrared type. Also, the local server may comprise means of connection to a central server for updating the information items destined for the interactive station.

The terminal may comprise communication means for exchanging data relating to at least one coupon with another mobile terminal. The interactive station may be associated with a payment terminal for deducting discounts relating to at least one coupon from a total amount for purchases made by the user, calculated by the payment terminal.

Turning now to the drawings, FIG. 1 shows a system comprising a mobile terminal 1 and a point of sale 7 of a sales company. This mobile terminal 1 comprises collection means 9,14,15 for collecting data contained in coupons 6. These coupons 6, which relate to RFID devices 6 or to one-dimensional tags 6, correspond, for example, to commercial offers. Via communication means 16,17,18,19, this mobile terminal exchanges the previously collected data relating to at least one discount coupon 6 with an interactive station 2. This interactive station 2 is connected to a local server 3 which is associated with at least one database 4 comprising a set of information items relating to at least one product. These information items relate, for example, to a product identification code or to a coupon identification code corresponding to the commercial offer in question, but also to a date of expiration of the offer, to images and other features of the product, and to its availability in the point of sale where the interactive station is located. This local server 3 is connected to a central server 5 which groups together, in databases with which it is associated, all the data coming from the various points of sale. This central server 5 can, thus, inform the local server 3 and, consequently, the interactive station 2 attached thereto, of the availability of a product in another point of sale when, for example, this product is sold out in the point of sale where local server 3 is located. Local server 3 is also connected to a set of terminals 12 for maintenance and administration of the databases, and also to payment terminals 13.

The mobile terminal 1 is a portable device which has a screen 8 and a keypad 9 and which comprises, in particular, data collection means 9,14,15 and communication means 16,17,18,19 for receiving and transmitting data. It allows a user inter alia to be able to consult information items relating to the discount coupons.

Figure 2:
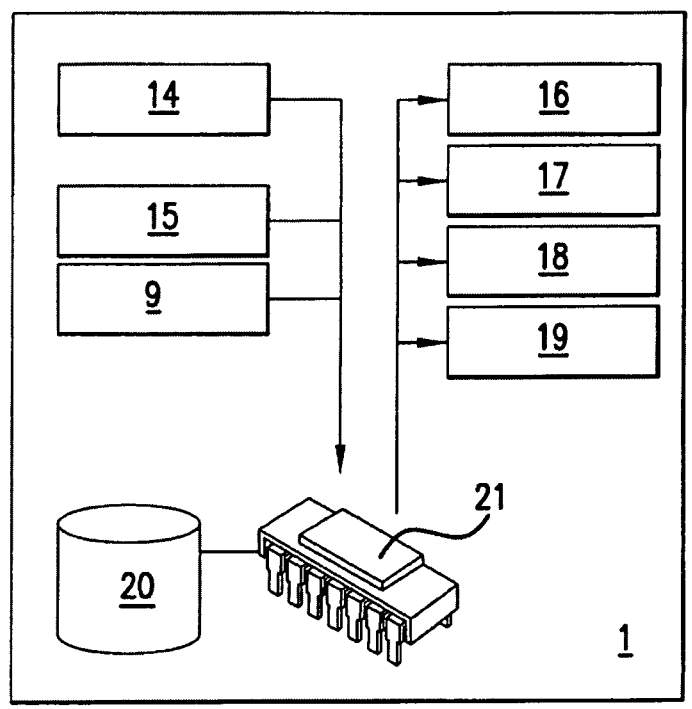
FIG. 2 schematically shows a mobile terminal.

Mobile terminal 1, shown in FIG. 2, may be a mobile telephone or a PDA (Personal Digital Assistant) or a smartphone (mobile telephone combined with a PDA) or the like. The collection means 9,14,15 of mobile terminal 1 use one and/or the other of the following technologies:

an NFC/RFID reader 14 capable of collecting data recorded in an RFID (Radio Frequency Identification) chip;

a digital camera device 15 or any other type of photographic technology comprising a system for capturing images, such as, e.g., CCD (Charge-Coupled Device) or CMOS (Complementary metal oxide semiconductor) sensors for collecting data contained in a one-dimensional barcode or a two-dimensional barcode;

a keypad 9 or touch-sensitive screen which makes it possible to input information items relating to the coupon.

The communication means of this mobile terminal use one and/or the other of the following technologies:

a Bluetooth module 16 which makes it possible to exchange the data, relating to a coupon, with another peripheral device equipped with this technology via a short-range radio link;

an RFID module 17 which makes it possible to transmit and receive data via a radio link when it is in the presence of an RFID reader belonging to another device;

an IrDA (Infrared Data Association) module 18 which makes it possible to exchange data via infrared waves with another peripheral device equipped with this technology;

a Wi-Fi (abbreviation for wireless fidelity) module 19 which makes it possible to exchange data via a radio link with another device equipped with Wi-Fi technology.

Mobile terminal 1 comprises a microprocessor 21 associated with memory means 20. These memory means 20 may be volatile or non-volatile or else may be a mass storage means. These memory means 20 make it possible to record the collected data relating to a coupon 6 and are designed, with a microprocessor 21 for executing various binary codes relating to programs, in particular, for managing the exchanges and storage of data and also for processing these data via various procedures.

Mobile terminal 1, via communication means 16,17,18,19, is able to exchange data with communication means 22,23, 24,25 of interactive station 2.

Figure 3:
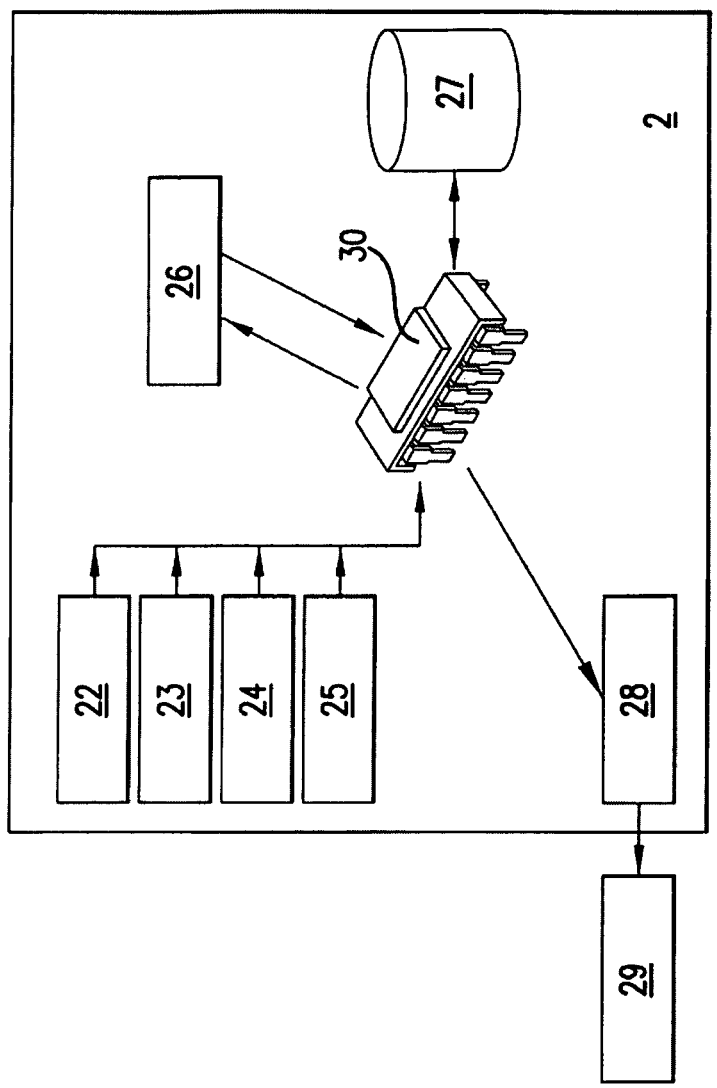
FIG. 3 schematically shows an interactive terminal.

In FIG. 3, interactive station 2 comprises communication means 22,23,24,25 which use one and/or the other of the following technologies:

an RFID module 23 which makes it possible to read an RFID device and transmit data to an RFID reader belonging to another device;

a Bluetooth module 22 for data exchanges;

an IrDA module 24;

a WiFi module 25.

Interactive station 2 comprises connection means 26 that connect to the local server 3. These connection means 26 may belong to the technologies described above for the communication means 22,23,24,25 or to conventional wired communications. Memory means 27 and a microprocessor 30 make it possible to execute binary codes relating to programs for interpreting the received data, for managing data exchanges with the mobile terminal 1 and the local server 3, for transmitting information items via printing means 28 and/or display means 10, and for managing an interactivity with the user via input means 11. The printing means 28 make it possible, in particular, to publish a paper support 29 corresponding, for example, to a discount coupon or comprising, for example, information items relating to the product benefiting from the offer such as, for example, its location in the point of sale or the address of another point of sale where the product is available. The information items relating to the product are also published on the display means 10.

Figure 4:
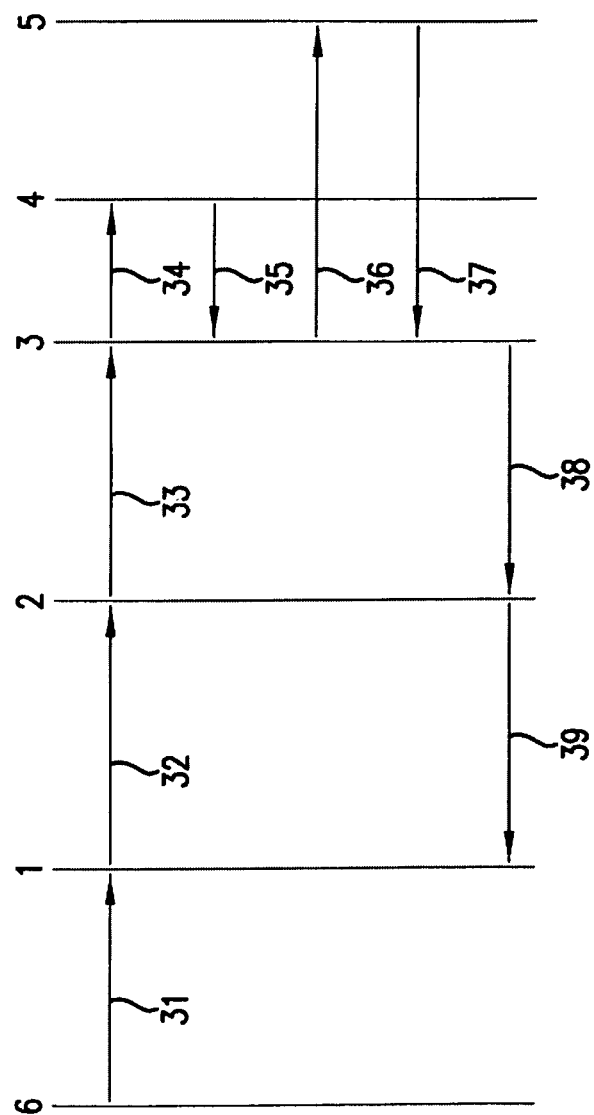
FIG. 4 shows selected steps of the method.

In FIG. 4, during a collection step 31, the mobile terminal 1 collects data contained in discount coupons 6 during a collection step 31. Coupons 6 correspond to RFID devices or to tags which may be one-dimensional or two-dimensional. These data may be collected via any type of support that is compatible with the collection means 9,14,15 of mobile terminal 1. The RFID devices and the tags correspond to discount coupons 6 which may appear in newspapers, in advertising posters and in any other support that may comprise the RFID devices and the tags.

It may be noted that a coupon code corresponding to a discount coupon relating to a product can be input via the keypad 9 of the mobile terminal 1. Then, based on this coupon code, the information items relating to this coupon can be updated via an interactive station.

On the other hand; a first user of mobile terminal 1 can collect discount coupons by exchanging, transferring or receiving coupons from a second user of a mobile terminal. The first user can select on mobile terminal 1 the discount coupon(s) 6 that the first user wishes to exchange by using the keypad 9 or the touch-sensitive screen of the mobile terminal to run through the information items relating to the discount coupon 6. These information items correspond to the image of the product, the date of expiration, the amount of discount or the type of offer given for the product. Once a selection has been made, the first user can transfer data relating to at least one coupon to the mobile terminal of the second user. In another configuration, the first user may have access to shared data relating to the discount coupons of the mobile terminal of the second user, and can make a selection in the same way to then be able to download the selected coupons 6 into the memory means 20 of mobile terminal 1. These exchanges take place via communication means 16,17,18,19 of mobile terminal 1 which comprise, for example, the technologies Bluetooth 16, IrDA 18, RFID 17 or WiFi 19.

The collected data are processed so that different information items are extracted.

These information items relate to the following features:
the code of the product to which the commercial offer relates;
the date of expiration of the coupon,
the commercial offer code,
the coupon code,
an image of the product,
a description of the features of the product,
a description of the features of the coupon, and
category of product.

It may nevertheless be noted that a coupon 6 may comprise only the coupon code as the single item of data. The additional information items relating to the coupon can be updated via the interactive station 2.

The stored data relating to the coupons are archived according to these features. The user, when consulting the coupons recorded on mobile terminal 1, can search for coupons on the basis of criteria relating to the date of expiration or else to the category of product.

The user also has the possibility of parameterizing a signal warning of the proximity of the date of expiration of coupon 6.

At least one interactive station 2 is located in each point of sale 7. During a connection step, the mobile terminal connects to one of the interactive stations in the point of sale 7. This connection is completely transparent for the user since the user has no parameterizing to carry out. This connection may be initiated by the mobile terminal 1 after the interactive station 2 has been detected by the communication means 16,17,18,19 of the mobile terminal 1. This connection may also be initiated by the interactive station 2.

Once the connection has been established, during a data exchange step 32, a protocol is used to transfer data relating to at least one coupon 6 from the mobile terminal 1 to the interactive station 2. The user has the possibility of selecting the information item that the user wishes to transfer to the interactive station 2. The user may select, depending on requirements, the code of the product to which the commercial offer relates, the commercial offer code, the coupon code, or the category of product.

By selecting the product code, for example, the user obtains all of the commercial offers relating to this product code. Several discount coupons proposing different offers may exist for one and the same product. By transferring the coupon code, the user will show, on the display means 10 of the interactive station 2, all the information items relating to the discount coupon, such as:
the code of the product to which the commercial offer relates;
the date of expiration of the coupon,
the commercial offer code,
the coupon code,
an image of the product,
a description of the features of the product,
a description of the features of the coupon,
category of product,
availability of the product in the point of sale,
location of the product in the point of sale,
availability of the product in another point of sale that is as close as possible, if the product is sold out.

By selecting the criterion relating to the commercial offer code, the user obtains all the coupons forming part of the same type of commercial offer on all the products in this point of sale.

By selecting the criterion relating to the category of product, the interactive station displays all the discount coupons relating to this category of product.

The user may also combine these information items. For a combination of the commercial offer code with a category of product, the display means 10 of the interactive station 2 may present discount coupons for all the products of the same category benefiting from a price offer belonging to the selected commercial offer code.

When the user selects an information item (at least one code) via mobile terminal 1, the information item is transferred to the interactive station 2 in the form of data. The interactive station 2 builds an enquiry based on these data. This enquiry is then transmitted, during an interrogation step 33, to a local server 3. This local server 3 is connected to at least one database 4 and to other terminals. These terminals are, in particular, payment terminals 13. The database 4 comprises different numerical tables comprising data relating to all the products on sale in the point of sale 7. These numerical tables are correlated with other numerical tables relating to commercial offers. This local server 3 transmits the enquiry to the database during a transmission step 34. This database solves the enquiry and sends a response to the local server 3 during a step 35. The local server 3 analyzes the response and builds an enquiry which it transmits to a central server 5 during a step 36. This step 36 is optional. The response to this enquiry, sent by the central server 5 to the local server 3 during step 37, comprises data capable of updating the data received from the database. The local server 3 builds a response based on all of the data that it has received from the database 4 and the central server 5. This response is then transmitted to the interactive station 2 during a step 38.

Once the data have been received, the interactive station 2 interprets these data and displays on a screen 10 the information items to which they relate. The user has the possibility of interacting via the input means 11 of the interactive station 2. For example, the user can navigate via a context-based menu through the information items that have been received to have more information about a product or a discount offer.

The user can print coupons to then use them when paying for purchases. During a step 39 of updating mobile terminal 1, the user can download new coupons and can also update the information items relating to the discount coupons already present in mobile terminal 1.

The interactive station 2 may be associated with a payment terminal by transmitting, via communication means 22,23, 24,25 or via its link to the local server 3, data that have been transmitted beforehand by the mobile terminal 1 relating to the discount coupons that are to be applied to the total amount for the purchases.

The payment terminal 13 may also comprise a module comprising communication means of the Bluetooth, Wi-Fi, IrDA or RFID/NFC technology type. This module is capable of exchanging data relating to at least one coupon. During scanning of the products by the reading means of the payment terminal, the mobile terminal 1 connects to the module. The data relating to the coupons which the user wishes to use during the purchasing process are transferred to this module and stored in memory means of the payment terminal 13. The discount coupons 6 are automatically applied to the corresponding total amount for the products. The data recorded in the memory means of the mobile terminal 1 are then updated. This updating may correspond to a deletion of coupons which can only be used once.

Our systems and methods are described above by way of example. It is understood that one skilled in the art is capable of implementing different variants of the systems and methods without departing from the scope of the appended claims.

The invention claimed is:

1. A method for managing at least one coupon for a user equipped with a mobile terminal comprising a collector, a communicator, and a memory which store a set of data relating to the coupon, comprising:
    collecting with the collector of the mobile terminal, data relating to a coupon contained in at least one of a terminal, a station, or a tag;
    transmitting data relating to the coupon by the mobile terminal to an interactive station in a point of sale for a product corresponding to the coupon;
    sending an enquiry relating to an availability of a product in one or more points of sale by the interactive station to a local server associated with a database comprising data relating to the product;
    transmitting the enquiry by the local server to a central server connected to the local server, said central server grouping together in a database data coming from one or more points of sale;
    sending a response to the enquiry relating to the availability of the product in another point of sale by the central server to the local server; and
    publishing, by the interactive station, information items corresponding to processing of the response to the enquiry transmitted by the local server.

2. The method according to claim 1, further comprising interrogating the central server by the local server based on the data contained in the enquiry to update the information items contained in the response received by the local server.

3. The method according to claim 1, wherein the step of transmitting data relating to the coupon comprises selection of one of the information items via a display and input of the mobile terminal.

4. The method according to claim 1, further comprising updating the data contained in the memory of the mobile terminal by the interactive station.

5. The method according to claim 1, wherein the publishing comprises generating at least one discount coupon in paper format by a printer.

6. The method according to claim 1, further comprising interrogating, via an input and a display, the interactive station to obtain information items relating to the coupon.

7. The method according to claim 1, wherein information items relate to a physical location of the product.

8. The method according to claim 1, wherein collecting corresponds to an exchange of data between mobile terminals, the exchanged data corresponding to at least one coupon.

9. A system for managing at least one coupon, comprising:
    a mobile terminal;
    an interactive station; and
    a local server;
    wherein said mobile terminal comprises:
        a data collector collecting data relating to said coupon;
        memory for storing said data relating to said coupon; and
        communication module for communicating with said interactive station in a point of sale of a product corresponding to the coupon and said local server;
    wherein said interactive station comprises:
        an interactive station communication module for exchanging data with said mobile terminal;
        connectors for transmitting enquiries to said local server; and
        a publisher for transmitting to said user items corresponding to processing of a received response to said enquiry transmitted to said local server, and
    wherein the system is configured to:
        collect with the collector of the mobile terminal, data relating to a coupon contained in at least one of a terminal, a station, or;
        transmit data relating to the coupon by the mobile terminal to an interactive station in a point of sale for a product corresponding to the coupon;
        send an enquiry relating to an availability of a product in one or more points of sale by the interactive station to a local server associated with a database comprising data relating to the product;
        transmit the enquiry by the local server to a central server connected to the local server, said central server grouping together in a database data coming from one or more points of sale;
        send a response to the enquiry relating to the availability of the product in another point of sale by the central server to the local server; and publish, by the interactive station, information items corresponding to processing of the response to the enquiry transmitted by the local server.

10. The system of claim 9, further comprising the central server, wherein the local server interrogates the central server based on the data contained in the enquiry to update the information items contained in the response received by the local server.

11. The system of claim 9, wherein the mobile terminal further comprises a display and an input, and wherein the mobile data transmits the data to the interactive station via the display and input of the mobile terminal.

12. The system of claim 9, wherein the interactive station is configured to update the data contained in the memory of the mobile terminal.

13. The system of claim 9, wherein the publisher prints said information items corresponding to processing by generating at least one discount coupon in paper format.

14. The system of claim 9, wherein the mobile terminal further comprises a display and an input, wherein via the input and the display the mobile terminal interrogates the interactive station to obtain information items relating to the coupon.

15. The system of claim 9, wherein information items relate to a physical location of the product.

16. The system of claim 9, wherein the data collector comprises facilitating an exchange of data between mobile terminals, the exchanged data corresponding to at least one coupon.

* * * * *